United States Patent [19]

Downs

[11] 4,285,771
[45] Aug. 25, 1981

[54] NUCLEAR CORE AND FUEL ASSEMBLIES

[75] Inventor: Robert E. Downs, Monroeville, Pa.

[73] Assignee: Westinghouse Electric Corp., Pittsburgh, Pa.

[21] Appl. No.: 13,939

[22] Filed: Feb. 22, 1979

[51] Int. Cl.³ ............................................. G21C 3/30
[52] U.S. Cl. ...................................... 176/76; 176/78
[58] Field of Search ................................. 176/78, 76

[56] References Cited

U.S. PATENT DOCUMENTS

| | | | |
|---|---|---|---|
| 3,261,758 | 7/1966 | Maldaque | 176/76 |
| 3,267,000 | 8/1966 | Ashcroft | 176/68 |
| 3,567,582 | 3/1971 | Dievoet | 176/78 |
| 3,713,971 | 1/1973 | Santen | 176/50 |
| 4,181,571 | 1/1980 | Jolly | 176/78 |

Primary Examiner—Donald P. Walsh

Attorney, Agent, or Firm—Edward L. Levine; Z. L. Dermer

[57] ABSTRACT

A fast flux nuclear core of a plurality of rodded, open-lattice assemblies having a rod pattern rotated relative to a rod support structure pattern. Elongated fuel rods are oriented on a triangular array and laterally supported by grid structures positioned along the length of the assembly. Initial inter-assembly contact is through strongbacks at the corners of the support pattern and peripheral fuel rods between adjacent assemblies are nested so as to maintain a triangular pitch across a clearance gap between the other portions of adjacent assemblies. The rod pattern is rotated relative to the strongback support pattern by an angle $\alpha$ equal to $\sin^{-1}(p/2c)$, where p is the intra-assembly rod pitch and c is the center-to-center spacing among adjacent assemblies.

13 Claims, 8 Drawing Figures

NUCLEAR CORE AND FUEL ASSEMBLIES

GOVERNMENT CONTRACT

This invention was made or conceived in the course of, or under a contract with the U.S. Department of Energy.

BACKGROUND OF THE INVENTION

1. Field of the Invention

This invention relates to liquid cooled fast flux nuclear reactor cores, and more particularly to a core of assemblies of hexagonally bundled fuel rods in an open-lattice array.

2. Description of the Prior Art

Proposed cores for liquid metal cooled fast nuclear reactors typically include closely packed hexagonal fuel assemblies whereby the core approaches the configuration of a right circular cylinder. Typical fuel assemblies include a plurality of fuel rods of circular cross section bundled in a triangular array within a full length thin walled duct. The fuel rods are supported at one end, allowing free axial expansion, and laterally supported along their length by wire wraps about the rods or by egg-crate type grid structures positioned at selected locations along the assembly length within the duct.

Such full-length ducted assemblies limit coolant cross flow among adjacent fuel assemblies, increase the amount of metal in the core, thereby lessening nuclear efficiency, and increase the pressure drop through the core which further decreases efficiency. These characteristics can be mitigated by use of open-lattice fuel assemblies which eliminate the full length duct, utilize full length support members, and position grid structures at selected axial positions, as well known in the generally square fuel assemblies of light water reactors having fuel rods positioned in a square array.

The fuel assemblies in light water reactors use supportive guide tubes disposed within the fuel rod array to carry axial loads and are designed to allow direct contact among grids of adjacent fuel assemblies. Such grid contact, however, is undesirable for a fast flux reactor. Swelling and distortion of components in the fast neutron flux can be greater than in the thermal neutron flux of a light water reactor. Such distortions, if not carefully controlled, could result in excessive contact and binding among adjacent assemblies severely complicating refueling operations. Additionally, contact among grids can result in coolant cross flow starvation at the point of contact, thereby increasing the localized temperature of the components and the likelihood of damage and binding.

Light water reactors, having fuel rods positioned on a square array, can readily utilize grids, the outer surfaces of which are generally flat. Thus, lateral displacement or load transfer among fuel assemblies is through the contact of two flat, parallel surfaces. And, the square rod pattern can be readily continued across assembly interfaces with all fuel rods laterally aligned although spaced a greater distance at the assembly interface. However, if continuity of a triangular fuel rod array is to be maintained across the interface of hexagonal fuel rod bundles, and excessive space between assemblies avoided, adjacent assemblies must be displaced from one another by one-half of the pitch of the fuel rod array. A very complex core structure, and core lateral restraint structure, would result if all of the hexagonal assemblies throughout a core were displaced from one another by one-half of the fuel rod pitch. Additionally, to avoid excessive spacing at the assembly interface, and to maintain a close approximation of the triangular rod array across adjacent assembly interfaces, nesting of fuel rods is desirable. Nesting, however, produces a large number of small interfaces among adjacent grids. Small lateral displacement can accordingly result in grid-to-grid contact which, as stated above, is undesirable.

It is thus desirable to provide an open lattice assembly for a liquid cooled, fast neutron flux reactor so as to achieve, among other advantages, coolant cross flow among assemblies. It is further desirable to provide a core of open lattice hexagonal assemblies which approximate maintenance of a triangular rod array across the interface of adjacent assemblies while maintaining a relatively simple total core arrangement and lateral support structure.

SUMMARY OF THE INVENTION

This invention provides an open lattice fuel assembly having grid structures and a core of such assemblies for a liquid cooled, fast flux nuclear reactor which provides for lateral interaction among assemblies without excessive grid-to-grid contact.

A fuel assembly in accordance with the invention includes coextending fuel rods of circular cross section arranged on a triangular rod array. The bundle of rods approaches the configuration of a regular hexagon, except that one or more rods at each corner of the hexagon is removed. At each corner there is located a strongback, generally coextensive with the fuel rods, which is the axial support for the assembly. The outer periphery of the strongback is also the area of contact among adjacent assemblies. At selected positions along the fuel assembly length are honeycomb-type grids forming regular hexagonal cells for each interior fuel rod, and modified hexagonal cells for the peripheral fuel rods. The assemblies are nested in a core so that the triangular array is substantially maintained across assembly interfaces with a slightly enlarged spacing across adjacent assembly peripheries. The fuel rods across adjacent assemblies are accordingly displaced from one another by one-half of the fuel rod pitch.

The strongbacks are arranged in a pattern which forms closely packed, regular hexagons throughout a core. However, the rod array, and the grid orientation supporting the rods, is rotated slightly from the hexagonal pattern formed by the strongbacks. In a preferred embodiment this rotation is approximately two degrees and allows nesting and close approximation of the triangular pitch across adjacent assembly interfaces.

The exact amount of rotation or hexagonal modification is dependent upon specific geometric parameters, including the number and size of fuel rods in each assembly, the rod pitch and the resulting center-to-center distance among adjacent assemblies. The specific rotation angle is determined, however, as the angle $\alpha$ formed by a right triangle, the hypotenuse of which is the center-to-center spacing (c) between adjacent assemblies. The short side of the triangular is a length equal to one-half of the intra-assembly fuel rod pitch (p). The angle $\alpha$ opposite the short side, the angle of fuel rod array rotation relative to the hexagon formed by the strongbacks, is readily determined knowing the length of two sides of a right triangle and is defined by $\alpha = \sin^{-1}(p/2c)$.

BRIEF DESCRIPTION OF THE DRAWINGS

The advantages, nature and additional features of the invention will be better understood from the following description, taken in connection with the accompanying drawings, in which.

DESCRIPTION OF THE PREFERRED EMBODIMENTS

Figure 1:
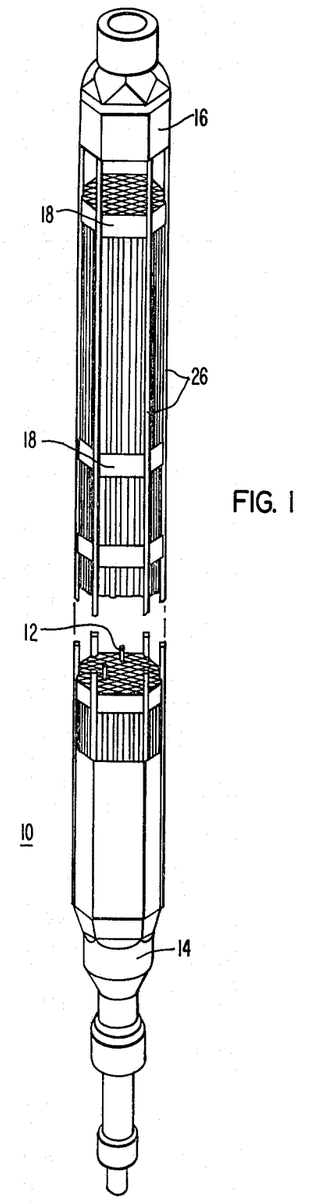
FIG. 1 is an elevational perspective view of a fuel assembly in accordance with the invention.

Referring now to FIG. 1, there is shown an open-lattice fuel assembly 10 for a fluid cooled fast flux nuclear reactor in accordance with the invention, preferably a reactor cooled by a liquid metal such as sodium. The assembly 10 includes a plurality of coextending, parallel fuel rods 12, each having nuclear material, such as fuel pellets, bundled together in a generally hexagonal open-lattice configuration. The term "open-lattice" refers to the absence of a duct structure laterally encasing the full length of the fuel rods 12. The rods 12 are supported at one end, such as by an inlet nozzle 14, and are free to expand axially upward toward an outlet nozzle 16. Lateral support of the fuel rods 12 is provided by a plurality of grid structures 18 spaced at selected intervals along the assembly 10 length. As well known in the art, the grids 18 allow axial expansion while maintaining lateral support for the fuel rods 12.

Figure 2:
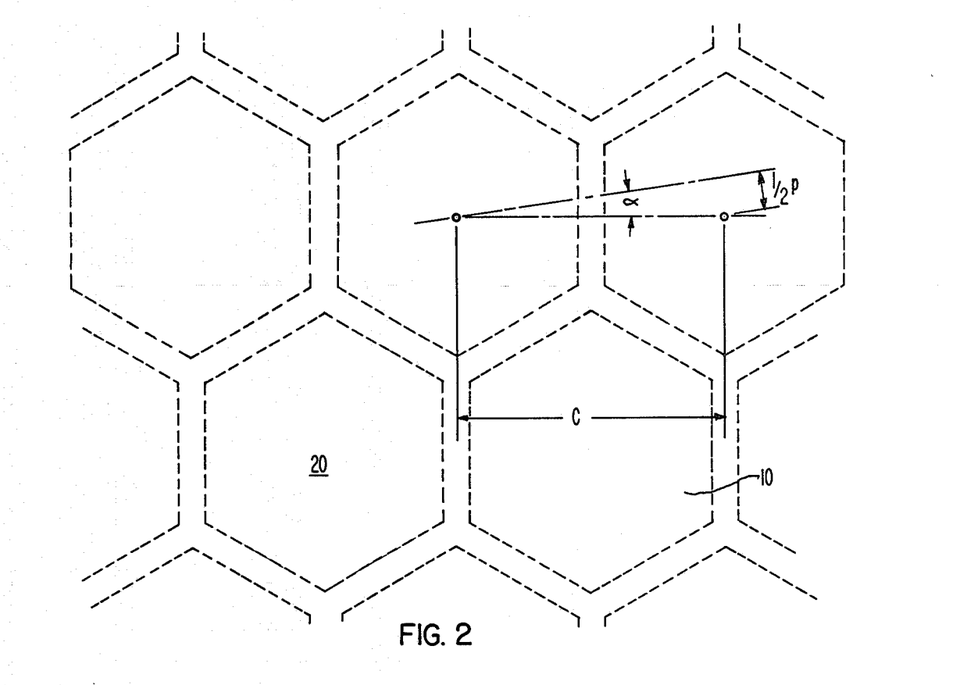
FIG. 2 is a schematic plan view of a portion of a core comprised of fuel assemblies such as shown in FIG. 1.
Figure 3:
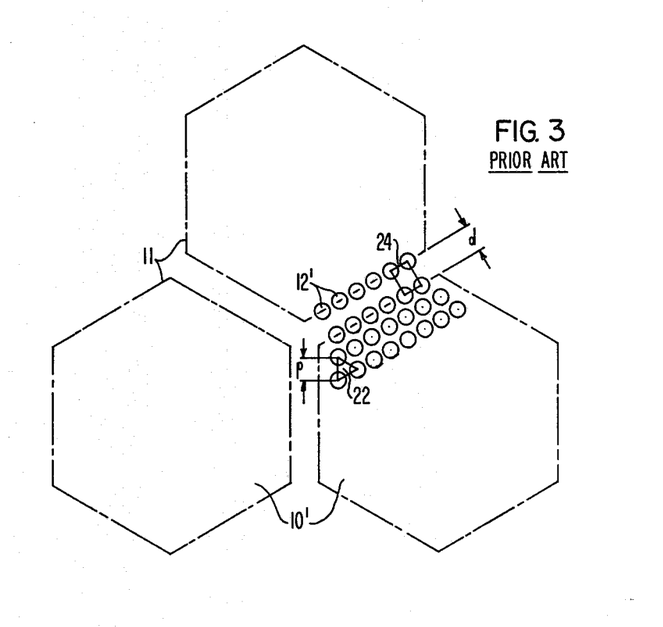
FIG. 3 is a schematic showing the relative positioning of fuel rods in prior art fuel assemblies.

FIG. 2 schematically illustrates the arrangement of a portion of a nuclear core 20 comprised of a plurality of the assemblies 10. The core 20, which can include hundreds of assemblies 10, approaches the configuration of a right circular cylinder. FIG. 3 illustrates the positioning of fuel assemblies 10' and the relative positioning of fuel rods 12' for prior art fuel assemblies. The assemblies 10' include ducts 11 which extend the full length of the fuel rods 12'. It can also be seen that while the fuel rods 12' are arranged in a triangular array, shown at reference numeral 22, within each assembly 10', the rods are arranged in a square array, shown at reference numeral 24, across the interface of adjacent assemblies 10'. It will also be noted that the spacing d between peripheral rods 12' of adjacent assemblies 10' is greater than the pitch p of the triangular intra-assembly array.

Figure 4:
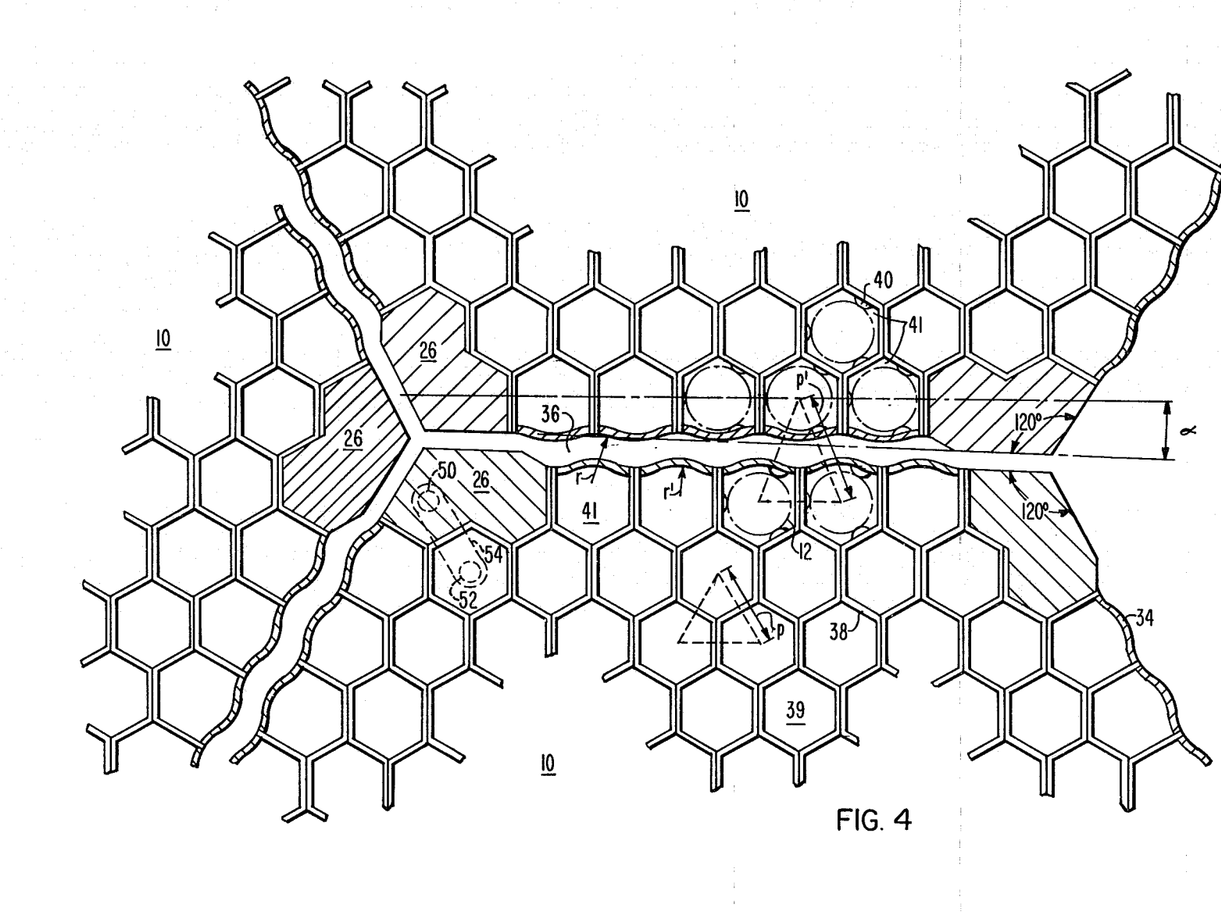
FIG. 4 is a plan view, in section, showing the interface among assemblies in accordance with the invention.
Figure 5:
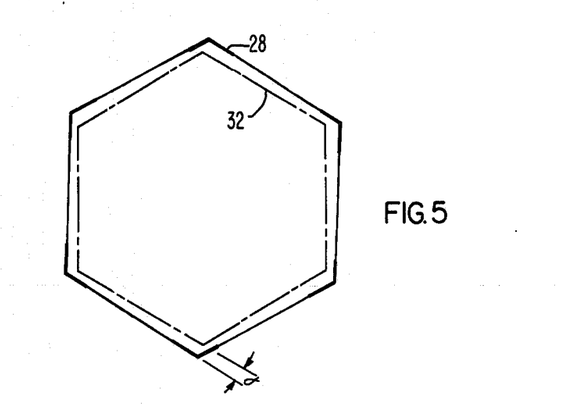
FIG. 5 is a schematic showing the relative positioning of the fuel assembly support structures and the fuel rod array.

FIG. 4 shows fuel assemblies 10 arranged to form a portion of a core which maintains a desired triangular array not only among fuel rods 12 of the same assembly, but also substantially maintains the same triangular array among fuel rods 12 of adjacent assemblies. The fuel rods 12 of adjacent assemblies are nested, or displaced from a position directly opposite one another across the interface by a distance equal to one-half of the pitch p. This displacement also allows the adjacent assemblies to be oriented with the rods 12 closer together across the interface than would be provided with the square interassembly array. Additionally, the overall generally hexagonal orientation of the rods is rotated from the hexagonal orientation of the supportive strong backs 26, as illustrated in FIG. 5, such that the two orientations are non-registering. The solid line 28 represents the hexagonal pattern formed by the bearing surfaces 30 (FIG. 4) and the dotted line 32 represents the generally hexagonal pattern formed by the fuel rod bundle.

Figure 6:
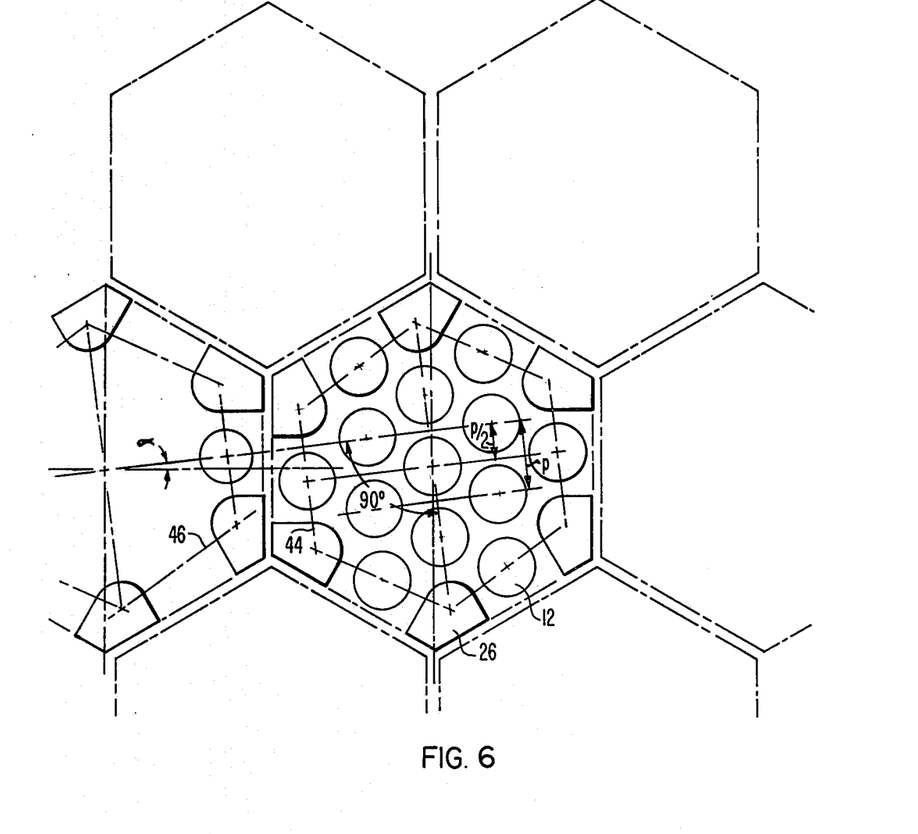
FIG. 6 is a view showing, similar to FIG. 5, relative positioning among fuel rods and strongback supports among adjacent fuel assemblies.

The relationship is shown in another fashion in FIG. 6 which additionally illustrates the parallel nature of peripheral fuel rods among adjacent assemblies, such as at lines 44 and 46.

The magnitude of the rotation, the angle $\alpha$ as shown on FIGS. 2, 4, 5 and 6, is determined geometrically. Referring again to FIG. 2, $\alpha$ is equal to the small interior angle of a right triangle with a hypotenuse equal to the center-to-center spacing between adjacent assemblies (c). The short leg, opposite the angle $\alpha$, is equal to one-half of the pitch among fuel rods within an assembly. This arrangement can also be described as $\alpha = \sin^{-1}(p/2c)$, where p is the intra-assembly rod pitch and c is the center-to-center spacing between adjacent assemblies.

As shown in FIG. 4, the arrangement provides for close spacing among adjacent assemblies, with lateral contact and loads being taken through the strongbacks 26. Since the bearing surfaces 30 of the strongbacks 26 are arranged to collectively form regular hexagons, the angle formed among the bearing surfaces is 120°, and the overall core can be positioned and supported in a simple, balanced, regular arrangement. The spacing or pitch p' among peripheral fuel rods closely approximates the spacing p, providing a more uniform power distribution throughout a core. The spacing p' is somewhat increased relative to the spacing p since the peripheral rods are separated by the thickness of two grid outer straps 34 and a coolant flow gap 36, as compared to a single grid inner strap 38 thickness and support member 40 size. It will be noted that inner grid cells 39 form substantially regular hexagons while peripheral cells 41 form modified hexagons since the outer straps 34 are arcuately corrugated to facilitate nesting. Parameters for an exemplary assembly 10 are shown in Table I. Column A refers to the embodiment of FIGS. 4 and 6, and column B to the embodiment of FIGS. 7 and 8.

TABLE I

| | Column A | Column B |
|---|---|---|
| Number of Fueled Rods | 157 | 151 |
| Support Hexagon Envelope (across flats) | 4.747 inches | — |
| Fuel Rod Centers Hexagon Envelope (across flats) | 4.375 inches | 4.375 inches |
| Fuel Rod Outer Diameter | 0.298 inches | 0.298 inches |
| Grid Inner Strap Thickness | 0.015 inches | 0.011 inches |
| Grid Outer Strap Thickness | 0.020 inches | 0.020 inches |
| Fuel Rod Intra-Assembly Pitch (p) | 0.361 inches | 0.361 inches |
| Fuel Rod Inter-Assembly Pitch (p') | 0.422 inches | 0.422 inches |
| Gap Between Assembly Outer Straps | 0.050 inches | 0.050 inches |
| Gap Between Adjacent | 0.015 inches | 0.015 inches |

TABLE I-continued

| | Column A | Column B |
|---|---|---|
| Strongbacks | | |
| Assembly Center-to-Center Spacing | 4.760 inches | 4.760 inches |
| Angle α | 2.176 degrees | 2.176 degrees |
| Radius of Outer Strap Arc (between rods, r) | 0.236 inches | 0.236 inches |
| Radius of Outer Strap Arc (about rod, r') | 0.186 inches | 0.186 inches |

It can also be seen from FIG. 4 that the strongbacks 26 each occupy what would be the position of two peripheral fuel rods 12 at each corner of the generally hexagonal fuel rod pattern. While a preferred arrangement consistent with the parameters of Table I is shown, it will be apparent that other orientations, extending through any number of otherwise fuel rod positions can be utilized. The actual configuration of the strongbacks should, however, facilitate inter-assembly contact through the strongbacks and provision of a suitable gap 36 (FIG. 4, Table I). As shown in FIG. 4, it is desirable to increase the length of bearing surface 30 contact while minimizing the number of fuel rod positions replaced by the strongbacks. The strongback shaping shown in FIG. 4 where, for example, only peripheral fuel rods are replaced, allows larger contact bearing surfaces than, for example, a strongback positioned at a location otherwise occupied by a corner fuel rod, shown by the dotted line 50 and an interior fuel rod 52, as enclosed in the dotted line 54.

It should be noted that since the grid outer straps 34 are nested and the fuel rod array is angled with respect to the bearing surfaces, translation of an assembly relative to an adjacent assembly will cause a small change in the clearance between adjacent outer grid straps. Although the effect on clearance is small, particularly since the angle α is small, the core restraint and support structure, as well as the extent of nesting, should limit the degree of motion between assemblies and accordingly the grid-to-grid contact.

Figure 7:
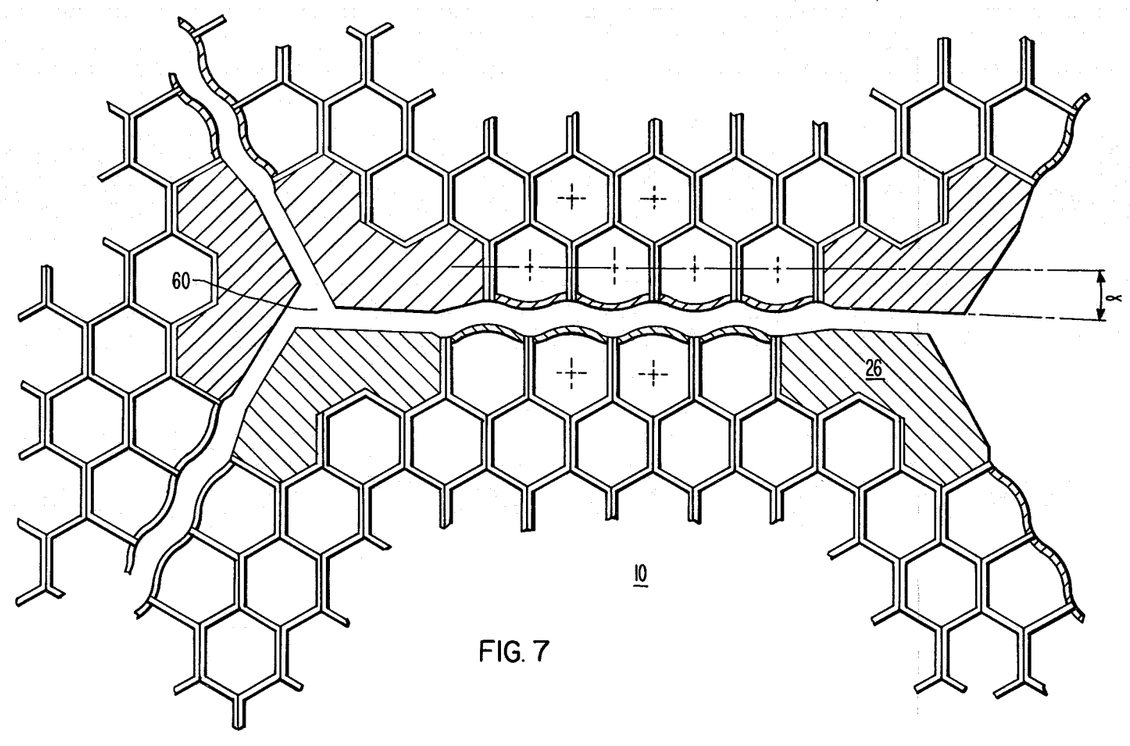
FIG. 7 is a plan view, in section, showing the interface among assemblies in accordance with another embodiment of the invention.
Figure 8:
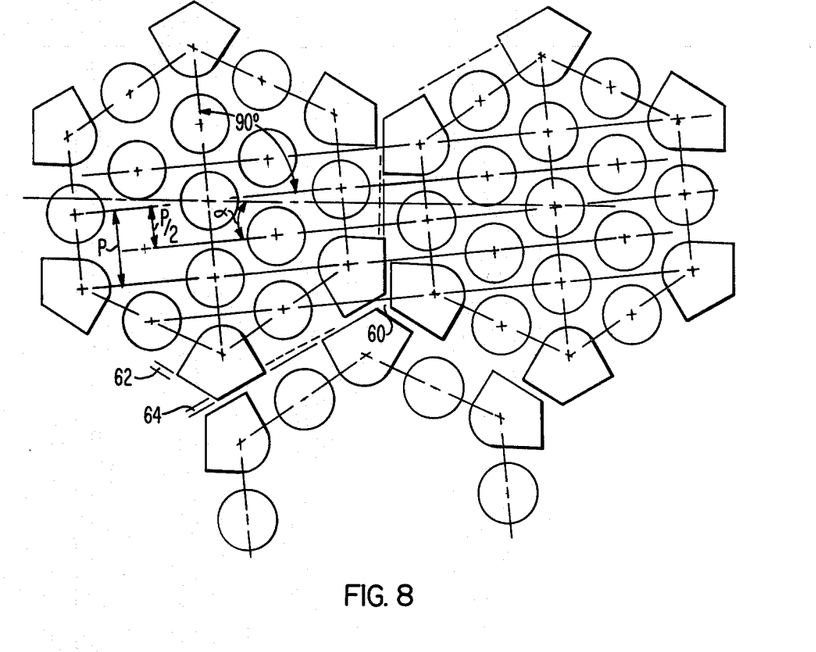
FIG. 8 is a view showing relative positioning among fuel rods and strongback supports among adjacent fuel assemblies.

Another preferred embodiment is shown in FIGS. 7 and 8 which are respectively similar to FIGS. 4 and 6. It should be noted that FIGS. 4 and 6 illustrate assemblies wherein the strongback occupies two cell positions and that FIGS. 7 and 8 illustrate assemblies wherein the strongback occupies three cell positions. Additionally, the strongbacks 26 of the assemblies shown in FIGS. 4 and 6 are positioned such that no gap appears among the strongbacks other than a generally Y-shaped contact space along the outer peripheries, shown best in FIG. 4. In the embodiment of FIGS. 7 and 8, however, an additional triangular space 60 appears. This results from a modification of the outer periphery of the strongbacks such that, relative to the embodiment of FIGS. 4 and 6, several mils of material is removed along one outer periphery, as shown at reference numeral 62 in FIG. 8, and a similar amount of material is added along the other outer periphery as shown at reference numeral 64. The angle between the two outer peripheries remains as 120°. This offset configuration provides additional assurance that in the event of a gross lateral displacement among adjacent assemblies, a strongback of one assembly will not contact a grid outer strap of the adjacent assembly. Although the nominal gap among grid outer straps remains the same, as shown from Table I, the triangular gap 60 allows greater lateral displacement prior to undesirable strongback-grid contact. In the embodiment of FIGS. 4 and 6, such contact can be made in the event of a lateral displacement of 0.12 inch, while a lateral displacement of greater than 0.40 inch would not permit such contact in the embodiment of FIGS. 7 and 8. The angle of rotation, α, between the fuel rod array and the strongback array, remains at 2.176 degrees.

It will be apparent that many modifications are possible within the scope of the above teaching, and that the preferred embodiment illustrated can be extended, not only to fuel assemblies, but also to other assemblies typical of a fast flux reactor, such as blanket and shield assemblies.

Since numerous changes may be made in the above described arrangement and different embodiments may be made without departing from the spirit and scope of the invention, it is intended that all matter contained in the foregoing description or shown in the accompanying drawings shall be interpreted as illustrative and not in a limiting sense.

I claim:

1. An assembly for a core of a fast flux fluid cooled nuclear reactor comprising a plurality of elongated coextending rods, having nuclear material, said rods being arranged in a first array and a plurality of support members generally coextensive with said rods being arranged in a second array, said first and second arrays being rotated a preselected angle relative to one another.

2. The assembly of claim 1 wherein said support members are disposed at peripheral locations with respect to said first array.

3. An assembly for a core of a fast flux fluid cooled nuclear reactor comprising a plurality of elongated coextending rods, bearing nuclear material, arranged in a triangular array to form a generally hexagonal rod pattern, and support structure for said rods including six strongbacks arranged to form a hexagonal support pattern, said support pattern being rotated a preselected angle α relative to said rod pattern.

4. The assembly of claim 3 wherein α is approximately two degrees.

5. The assembly of claim 3 further comprising a plurality of grid structures for laterally spacing and supporting said rods, said grids being positioned at preselected locations along the assembly length and forming generally hexagonal cells about each said rod, the outer straps of said grids being arcuately corrugated.

6. A core for a fast flux fluid cooled nuclear reactor comprising a plurality of closely arranged assemblies, said assemblies including a plurality of elongated coextending rods, having nuclear material, said rods being arranged in a triangular array so as to form a generally hexagonal peripheral pattern, and a plurality of strongbacks, generally coextensive with said rods, arranged in a hexagonal pattern, said hexagonal peripheral rod pattern being rotated by a preselected angle α relative to said strongback hexagonal pattern.

7. The core of claim 6 wherein the pitch of said triangular array is p, the distance from the center of one assembly to the center of an adjacent assembly is c, and wherein α is equal to $\sin^{-1}(p/2c)$.

8. The core of claim 6 wherein α is approximately two degrees.

9. The core of claim 6 wherein each assembly further comprises a plurality of grid structures for laterally spacing and supporting said rods, said grids being positioned at preselected locations along the assembly length, and wherein contact among adjacent assemblies is initially through said strongbacks, a larger clearance being provided among grids of adjacent assemblies than among strongbacks of adjacent assemblies.

10. The core of claim 6 or 9 wherein the pitch of said triangular array of rods is p and said assemblies are nested together such that rods of adjacent assemblies are also arranged in a triangular array with a pitch substantially equal to, but no less than p.

11. The core of claim 6 or 9 wherein said strongbacks include outer bearing surfaces positioned at an angle of 120 degrees relative to one another.

12. A fuel assembly for a core of a fast flux fluid cooled nuclear reactor comprising a plurality of elongated, coextending, parallel fuel rods, having nuclear fuel material, said rods being arranged in a lateral array which peripherally forms a first regular polygon, and a plurality of elongated strongbacks parallel with said fuel rods and arranged in a lateral array which forms a second regular polygon, said first and second polygons having the same number of sides, said first and second polygons being rotated relative to one another by a preselected angle.

13. A fuel assembly for a core of a fast flux fluid cooled nuclear reactor comprising a plurality of elongated parallel fuel rods, having nuclear fuel material, said rods being arranged in a first pattern having six peripheral sides whereby lines extending through the centers of each peripheral rod on each of said six peripheral sides form, upon extension to intersection, a regular hexagon, said fuel assembly further having six peripheral strongback supports arranged in a second pattern forming a second regular hexagon, said first and second hexagons being rotated relative to one another approximately two degrees.

* * * * *